3,189,410
METHOD OF PRODUCING ANHYDROUS ALKALI METAL CYANIDE

Iral Brown Johns, Marblehead, Mass., assignor to Monsanto Research Corporation, St. Louis, Mo., a corporation of Delaware
No Drawing. Filed Mar. 29, 1963, Ser. No. 269,177
7 Claims. (Cl. 23—79)

This invention relates to alkali metal salts and more particularly, provides a novel method for the preparation of an alkali metal cyanide.

The cyanides of the alkali metals vary quite markedly in the ease with which they undergo hydrolysis. Potassium cyanide is relatively resistant to hydrolysis, and can be obtained in pure form from the reaction of potassium carbonate with carbon and ammonia, or from the reaction of potassium hydroxide with hydrogen cyanide. Moreover, the anhydrous salt is the stable form at conveniently low temperatures, so that it can be precipitated from aqueous solutions without difficulty. For sodium cyanide, the reaction of sodium carbonate with carbon and ammonia gives impure product, and the sodium hydroxide reaction with HCN gives product which is only about 90% NaCN, the rest consisting of hydrolysis and oxidation products. HCN released by hydrolysis of a lower atomic weight alkali metal cyanide tends to polymerize, the polymerization being catalyzed by base, with the result that the black polymer of HCN is formed. This is a particularly objectionable, discoloring organic impurity in a cyanide salt product.

Lithium cyanide is even more hydrolysis-sensitive than sodium cyanide. In the reaction of solid lithium hydroxide and hydrogen cyanide gas, the product is only about 40% LiCN. When the reaction of lithium hydroxide and hydrogen cyanide is conducted under anhydrous conditions in ether, the product obtained is still only about 60% lithium cyanide, the rest consisting of undesirable contaminants which are difficult to separate, such as the black polymer of hydrogen cyanide.

Valuable uses exist for pure, anhydrous form of the lower atomic weight alkali metal cyanides which make it desirable to develop methods for providing these cyanides essentially free of contaminants. Thus, use has been made of the metallic element as a starting material, in the manufacture of sodium cyanide employing metallic sodium, ammonia and carbon, for example. Lithium cyanide in pure, anhydrous form can be used to effect unique reactions, as further set forth hereinafter.

Provision of these lower atomic weight alkali metal cyanides in pure, anhydrous form as accomplished heretofore has involved undesirable and hazardous practices such as handling of the metallic element, a requirement that the conversion of the element to the cyanide be effected rapidly if byproduct formation is to be avoided, and so forth. Thus, a need exists for a convenient method for preparing the really anhydrous cyanides of these alkali metals, and particularly so in the case of lithium cyanide, in view of the extreme ease of its hydrolysis and polymerization of the resulting HCN.

It is an object of this invention to provide an improved method for the preparation of a lower atomic weight alkali metal cyanide.

A particular object of this invention is to provide a convenient method for the preparation of a lower atomic weight alkali metal cyanide which avoids hydrolysis and produces substantially pure product.

These and other objects will become evident upon consideration of the following specification and claims.

In accordance with the present invention, an alkali metal cyanide is prepared by contacting an alkali metal organic derivative with hydrogen cyanide in an inert organic liquid reaction medium, under anhydrous conditions, in accordance with the equation $$R-M + HCN \rightarrow MCN + RH$$

where M is an alkali metal with an atomic weight below 40 and R is an inert organic radical.

The stated method is particularly conveniently adapted for production of the hydrolysis-sensitive cyanides of the lower atomic weight alkali metals, sodium and lithium, and especially so for lithium cyanide preparation.

The organolithium compounds such as the lithium alkyls are soluble in organic hydrocarbon solvents such as pentane and hexane, providing desirable homogeneity of the reaction mixture thereof with the hydrogen cyanide reactant. The reaction proceeds smoothly and readily to completion, which is in contrast to the reaction of metallic lithium with anhydrous HCN, wherein reaction is incomplete in the absence of a liquid organic reaction medium, and in presence of a solvent, must be effected with particular rapidity to avoid the appearance of HCN polymer. The lithium cyanide product of the present novel method precipitates from the liquid reaction medium as a fine crystalline mass which is readily separated from other reaction mixture components to provide 100% yields of pure anhydrous product. The freedom of this product from contaminants is such that it can be stored for weeks in dry air without discoloration.

Lithium cyanide is very soluble in alcohol, insoluble in hydrocarbon solvents, and somewhat soluble in oxygenated solvents such as dimethylformamide, dimethylsulfoxide and dimethylacetamide. Slurries of the anhydrous salt in these solvents have been found to be remarkably reactive with compounds containing replaceable halogen atoms, and are especially useful for replacing halogen with CN in compounds of boron, silicon and phosphorous.

Although boron trichloride does not react with silver cyanide, it reacts vigorously with lithium cyanide, and indeed, moderation of the reaction by means of a solvent is necessary to prevent decomposition. Chlorodiphenylphosphine oxide in benzene or xylene reacts neither with potassium cyanide nor with silver cyanide, but with lithium cyanide the cyano derivative is obtained in 80% yield. When acetonitrile is used as solvent, the yield increases to 95%. Displacement of the halogen atoms of diphenyldicholorosilane by lithium cyanide proceeds vigorously in dimethylformamide. The lithium cyanide product of the present invention can also be used to displace the halogen atom of a reactive organic halide such as ω-bromoacetophenone to provide the corresponding cyano derivative.

The presently provided novel method for anhydrous alkali metal salt synthesis is also applicable, as stated above, to the production of anhydrous sodium cyanide. The organo-sodium compounds such as the sodium alkyls, by contrast to the corresponding lithium alkyls, are insoluble, or practically insoluble, in inert organic solvents such as hydrocarbons like benzene and hexane. However, it has now been established that a slurry of such a sodium hydrocarbyl in an inert hydrocarbon diluent will react with hydrogen cyanide to completion, yielding the desired anhydrous inorganic cyanide, free of hydrolysis products. Thus, whereas the stated insolubility could have been expected to produce a less complete conversion than the lithium alkyls give, the present method is in fact found to be usefully applicable for production of the anhydrous cyanide of sodium, also. The present method can be practiced using readily handled organic solvent/diluent reaction media, avoiding the high temperatures and the other inconveniences of operating with the ammonia process for anhydrous sodium cyanide manufacture.

The method of this invention may also be used for preparation of pure anhydrous potassium cyanide from an organo-potassium compound such as a potassium alkyl, by reaction with hydrogen cyanide, where for some reason the present method is the procedure of choice for this cyanide.

Referring now to the organometallic compounds employed in conducting the present novel method, these are the alkali metal organic compounds represented by the formula R—M where M is an alkali metal with an atomic weight below 40 and R is a monovalent inert organic radical. In the cyanide-forming reaction

R—M+HCN→R—H+M—CN where R and M are as defined above, the organic radical R is converted to an organic compound R—H, which is a byproduct of the reaction.

The organic alkali metal compound employed as starting material may include any organic radical which is free of interfering substituents and which, on formation of an organic compound by displacement of its bond to the alkali metal radical, can be removed from the reaction mixture by procedures not deleterious to the desired alkali metal cyanide product, such as volatilization at temperatures below the decomposition temperature of the cyanide. In general, the useful compounds are those in which the stated organic radical is of moderate to low molecular weight, preferably containing up to about 12 carbon atoms, and preferably, not more than about 6 carbon atoms. Generally, it is desirably a hydrocarbon radical and preferably an alkyl hydrocarbon radical. Exemplary of such lithium alkyls are methyl lithium, ethyl lithium, propyl lithium, isopropyl lithium, n-butyl lithium, isobutyl lithium, sec-butyl lithium, t-butyl lithium, n-amyl lithium, iso-amyl lithium, cyclohexyl lithium, n-heptyl lithium, dodecyl lithium and the like. Aromatic lithium hydrocarbyls, including aryl, alkaryl and aralkyl are also contemplated, such as, for example, phenyl lithium, tolyl lithium, naphthyl lithium, benzyl lithium, phenylisopropyl lithium and so forth. Where the present method is to be applied to sodium cyanide synthesis, illustrative of organosodium compounds which may be employed for the starting material are sodium hydrocarbyls such as methyl sodium, ethyl sodium, propyl sodium, butyl sodium, amyl sodium, hexyl sodium, cyclohexyl sodium, octyl sodium, decyl sodium, dodecyl sodium, phenylisopropyl sodium, 3,5-dimethylbenzyl sodium, naphthylmethyl sodium, benzyl sodium, phenyl sodium, tolyl sodium, naphthyl sodium and the like. Potassium hydrocarbon compounds are also available, including, for example, methyl potassium, ethyl potassium, amyl potassium, benzyl potassium, tolyl potassium, dodecyl potassium, phenyl potassium and so forth.

The hydrogen cyanide used in conducting the reaction, as is the case with the other reaction mixture components also, of course, should be substantially anhydrous, to prevent possible hydrolysis, and also free of any other objectionable contaminants which would diminish purity of the product. Diluents and associated substances inert under the reaction conditions, such as gases like methane and nitrogen, which are readily flushed out of the reaction mixture, may be present without undue interference. Speed and convenience of reaction may be enhanced by introducing the hydrogen cyanide as a solution in a suitable solvent, such as benzene for example, but with the present novel method of producing cyanides, this is not essential, and undiluted hydrogen cyanide may be passed into the reaction mixture without harm.

The present method for preparation of an alkali metal cyanide consists of the reaction of an organometallic compound with HCN in a reaction medium which comprises an inert organic liquid. Where it is possible to form a homogeneous reaction mixture, this will desirably be a solvent for the organometallic compound, but as noted above, heterogeneous systems wherein the organometallic is dispersed in a liquid diluent are also operable. Useful inert liquid organic media are preferably hydrocarbon solvents and diluents like benzene, pentane, hexane, cyclohexane, light petroleum, kerosene and the like. Ethers such as diethyl ether and tetrahydrofuran dissolve lithium alkyls, but tend to form complexes with them, making these less desirable solvents.

The procedure used in conducting the method of the invention consists in contacting hydrogen cyanide with the organometallic compound of the alkali metal in presence of the inert organic liquid reaction medium. The hydrogen cyanide is introduced gradually into a solution or dispersion of the organometallic, in a presently preferred procedure. This is not critical, however, and the organometallic can alternatively be added to a solution of the HCN, the addition can be made all at once, and so forth. Though approximately the stoichiometric proportions, a 1:1 molar ratio, are desirable for economy, this is not essential. It is found that excess HCN, which is soluble in an organic solvent like benzene, can readily be washed out of the metal cyanide product with such solvents. That gradual addition of the hydrogen cyanide is effective shows that presence of excess organometallic does not interfere with the reaction, and at least with organometallics like lithium alkyls, which are soluble in a hydrocarbon solvent whereas lithium cyanide is not, excess organometallic can also readily be removed from the metal cyanide product by washing with organic solvents. Thus for example, the molar ratio of hydrogen cyanide to organometallic may be varied from a 10:1 to a 1:10 molar ratio if desired. The ratio of liquid reaction medium to the reactants may also be varied. It is usually convenient for this to be, for example, about equal to the volume of the reactants or at least enough to provide a stirrable reaction mass, and the amount may be increased much beyond this, to any convenient extent. Part of the liquid may be introduced as the solvent of a HCN solution used to introduce this gas to the reaction mixture if desired.

The reactants may, if desired, be freshly prepared, or they may be prepared in advance and stored until needed. The desirability of employing stabilizers to promote storage stability of certain of the materials used in the present method may often make the use of freshly prepared reactants desirable, to avoid having to purify the product of stabilizers, for example.

The temperature of reaction may range from above the freezing point of the reaction mixture to any temperature below the decomposition temperatures of the reaction mixture components. Generally, the range of 0 to 150° C. is suitable, and cooling to below room temperature (that is, to below about 25° C.) may be desirable. The pressure may also vary over a wide range such as from subatmospheric pressures of down to say 50 millimeters (mm.) Hg up to superatmospheric pressures of 10,000 pounds per square inch or above. Generally atmospheric pressures are suitable. It is usually desirable to maintain a nitrogen atmosphere over the surface of the reaction mixtures to avoid access of air.

On completion of the reaction, usual procedures for product isolation, such as washing, removal of solvent or diluent by distillation and the like, serve to provide the metal cyanide product in pure, anhydrous form. The present method may be practiced as a batch or a continuous process.

The invention is illustrated but not limited by the following examples.

*Example 1*

This example illustrates preparation of lithium cyanide by the method of the invention.

Pure anhydrous liquid hydrogen cyanide is prepared by adding a solution of 50 grams (g.) of sodium cyanide in 60 milliliters (ml.) of water slowly to a mixture of 100 g. concentrated sulfuric acid, 40 ml. water and 1 g. of ferrous sulfate at 90°. The off-gas is passed through a flask full of calcium chloride kept at 50° C. and the HCN is thereafter condensed in a trap cooled with ice.

A solution of lithium butyl in hexane, having a volume of 120 cc. and containing 0.2 mole of lithium butyl, is held under nitrogen in a flask to which the HCN trap is connected. The HCN trap is placed in warm water (35° C.) and the hydrogen cyanide slowly distills over into the flask containing the lithium butyl, which is swirled to facilitate mixing. A substantial exotherm is observed, and the flask is cooled with water. After about a two-fold excess of hydrogen cyanide has been introduced into the lithium butyl solution, the flask is heated to distill off the solvents. The residue in the flask is dried under vacuum at 90° C. at $10^{-3}$ millimeters (mm.), during which a high-boiling oil (introduced with the lithium butyl solution) rather slowly evolves. The product is essentially pure lithium cyanide.

*Example 2*

This example illustrates another preparation of lithium cyanide.

Hydrogen cyanide is generated by addition of sodium cyanide to sulfuric acid containing iron sulfate, as before, and trapped in a tared receiver immersed in an ice water bath. The trapped hydrogen cyanide is then vaporized by immersion of the receiver in a hot water bath, with the receiver being connected into a flask containing a hexane solution of approximately 50 g. of n-butyl lithium, cooled by an ice water bath, and under an atmosphere of nitrogen. As the hydrogen cyanide enters, formation of solid in the solution of the butyl lithium is observed.

Thereafter, the solvent is distilled off, petroleum ether is added, and this is then distilled off, leaving the product as a greyish solid. This solid is washed with benzene and then with petroleum ether until the washings are clear. The resulting solid is dried at room temperature under high ($10^{-3}$ mm.) vacuum and the melting point determined to be 161–164° (corrected).

The product is then extracted with hexane, which yields a brown filtrate, then with benzene and then 3 times with hexane followed by 3 washings with petroleum ether. It is again dried under a vacuum of $10^{-3}$ mm., providing a very white product which has a sharp melting point at 161–162° C. (corr.).

*Example 3*

This example illustrates use of a hydrogen cyanide solution for the production of pure lithium cyanide.

A solution is prepared of 30.1 g. of liquid HCN in 32.1 ml. benzene, and this is added dropwise to an ice-cooled solution of about 64 g. of n-butyl lithium in hexane. An exothermic reaction occurs with formation of a white precipitate. To ensure completeness of reaction, an additional 3.9 g. of HCN in a little benzene is added, and the reaction mixture is then filtered. After washing with four portions of anhydrous benzene, the tan solid product is maintained under nitrogen and washed 4 times with dried petroleum ether. Finally it is heated at 100° C. under vacuum to dry it, providing lithium cyanide as a solid, M. 162° (corrected).

*Example 4*

This example illustrates preparation of anhydrous sodium cyanide.

A quantity of about 50 g. of n-butyl sodium in heptane is washed into a reaction flask with petroleum ether, and maintained under a dry nitrogen atmosphere while 18.6 g. of liquid HCN in 25 g. of benzene is added, during which time the temperature of the reaction flask is held at about 8–10° C. and the reaction mixture is stirred. Formation of white salt occurs and the reaction mixture changes from its original brown-black color to a purplish color. Finally a further 3 g. of liquid HCN in 10 g. of benzene are added, but still the filtrate contains no HCN. The solid is filtered off and washed with benzene, and a further 10.65 g. of HCN in 22 g. of anhydrous benzene is introduced. The benzene phase in which the solid is suspended now shows the presence of dissolved HCN, and the reaction mixture is filtered to remove the solvent phase. Fresh benzene is added to wash the solid and removed by filtration, after which the product is dried under vacuum with a hot water bath. The product comprises pure white anhydrous sodium cyanide.

While the invention has been described with particular reference to various specific preferred embodiments thereof, it is to be appreciated that the modification and variations may be made without departing from the scope of the invention, which is limited only as defined in the appended claims.

What is claimed is:

1. The method of producing anhydrous alkali metal cyanide free of hydrolysis products which comprises contacting the organometallic compound of an alkali metal having an atomic weight below 40 of the formula R—M where M is said alkali metal and R is a hydrocarbon radical of up to 12 carbon atoms with hydrogen cyanide in a hydrocarbon solvent under anhydrous conditions.

2. The method of claim 1 in which said alkali metal is a lower alkali metal the cyanide salt of which is hydrolysis-sensitive.

3. The method of claim 2 in which said alkali metal is lithium.

4. The method of claim 3 in which said organolithium compound is a lithium alkyl.

5. The method of preparing pure anhydrous lithium cyanide which comprises contacting hydrogen cyanide with a solution of a lithium alkyl in a hydrocarbon solvent under anhydrous conditions, in which said alkyl radical is a hydrocarbon radical of up to 12 carbon atoms.

6. The method of claim 2 in which said alkali metal is sodium.

7. The method of preparing anhydrous sodium cyanide free of hydrolysis products which comprises contacting hydrogen cyanide and an organosodium compound of the formula R–Na, in which R is a hydrocarbon radical of up to 12 carbon atoms, in a hydrocarbon solvent under anhydrous conditions.

References Cited by the Examiner

UNITED STATES PATENTS

| | | | |
|---|---|---|---|
| 1,596,119 | 8/26 | Poindexter | 23—79 |
| 1,909,903 | 5/33 | Schumann et al. | 23—79 |
| 2,381,285 | 8/45 | Hill | 23—79 |

MAURICE A. BRINDISI, *Primary Examiner.*